(12) United States Patent
Lynch et al.

(10) Patent No.: US 9,746,983 B2
(45) Date of Patent: Aug. 29, 2017

(54) EMBEDDED FORCE MEASUREMENT

(71) Applicant: Apple Inc., Cupertino, CA (US)

(72) Inventors: Stephen Brian Lynch, Portola Valley, CA (US); Benjamin Mark Rappoport, Los Gatos, CA (US); Fletcher R. Rothkopf, Los Altos, CA (US); Paul Stephen Drzaic, Morgan Hill, CA (US); Scott Andrew Myers, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/578,134

(22) Filed: Dec. 19, 2014

(65) Prior Publication Data
US 2015/0103050 A1      Apr. 16, 2015

Related U.S. Application Data

(63) Continuation of application No. 13/306,554, filed on Nov. 29, 2011, now Pat. No. 8,922,523.

(51) Int. Cl.
*G06F 3/046* (2006.01)
*G06F 1/16* (2006.01)
*G06F 3/041* (2006.01)

(52) U.S. Cl.
CPC .......... *G06F 3/046* (2013.01); *G06F 1/1643* (2013.01); *G06F 1/1652* (2013.01); *G06F 3/0412* (2013.01); *G06F 3/0414* (2013.01); G06F 2203/04105 (2013.01)

(58) Field of Classification Search
CPC ...... G06F 3/046; G06F 3/0412; G06F 1/1652; G06F 1/1643; G06F 3/0414; G06F 2203/04105
See application file for complete search history.

(56) References Cited

U.S. PATENT DOCUMENTS

| | | | |
|---|---|---|---|
| 7,129,935 B2 | 10/2006 | Mackey | |
| 7,430,925 B2 * | 10/2008 | Son | G01L 1/205 73/862.046 |
| 7,608,948 B2 | 10/2009 | Nearhoof et al. | |
| 7,623,112 B2 | 11/2009 | Chen et al. | |
| 7,698,084 B2 | 4/2010 | Soss | |
| 2003/0227441 A1 | 12/2003 | Hioki | |
| 2005/0174335 A1 | 8/2005 | Kent et al. | |

(Continued)

FOREIGN PATENT DOCUMENTS

| | | |
|---|---|---|
| KR | 2007-0094335 | 9/2007 |
| KR | 2009-0131149 | 12/2009 |

*Primary Examiner* — Andrew Sasinowski
(74) *Attorney, Agent, or Firm* — Joseph F. Guihan

(57) ABSTRACT

Disclosed embodiments relate to a force detection system that detects force exerted on a flexible display based upon changes in resistance and/or capacitance. In one embodiment, a method includes measuring a baseline comprising a baseline resistance or a baseline capacitance or both of a force measurement layer disposed within or overlaid on the display panel. The method further includes detecting a change in the baseline resistance or the baseline capacitance or both and calculating a change location where the change in the baseline resistance or the baseline capacitance or both occurred. The method also includes calculating a magnitude of the change in the baseline resistance or the baseline capacitance or both.

19 Claims, 6 Drawing Sheets

(56) References Cited

U.S. PATENT DOCUMENTS

| | | | |
|---|---|---|---|
| 2006/0284856 A1* | 12/2006 | Soss | G06F 3/0418 345/173 |
| 2008/0062148 A1* | 3/2008 | Hotelling | G02F 1/13338 345/174 |
| 2008/0259046 A1 | 10/2008 | Carsanaro | |
| 2008/0278070 A1* | 11/2008 | Kim | G06F 3/0412 313/504 |
| 2009/0149200 A1 | 6/2009 | Jayasinghe et al. | |
| 2009/0256817 A1* | 10/2009 | Perlin | G06F 3/0233 345/174 |
| 2010/0007625 A1* | 1/2010 | Jiang | G06F 3/0414 345/173 |
| 2010/0013791 A1 | 1/2010 | Haga et al. | |
| 2010/0045612 A1 | 2/2010 | Molne | |
| 2010/0056223 A1 | 3/2010 | Choi | |
| 2010/0177057 A1 | 7/2010 | Flint et al. | |
| 2010/0182273 A1 | 7/2010 | Noguchi et al. | |
| 2010/0214258 A1 | 8/2010 | Kuan | |
| 2010/0231548 A1* | 9/2010 | Mangione-Smith | G06F 3/0412 345/174 |
| 2010/0231555 A1 | 9/2010 | Mackey | |
| 2010/0277431 A1* | 11/2010 | Klinghult | G06F 3/0412 345/174 |
| 2011/0210939 A1* | 9/2011 | Reynolds | G06F 3/0418 345/174 |
| 2011/0248948 A1* | 10/2011 | Griffin | G06F 3/041 345/174 |

\* cited by examiner

EMBEDDED FORCE MEASUREMENT

This application is a continuation of patent application Ser. No. 13/306,554, filed Nov. 29, 2011 which is hereby incorporated by reference herein in its entirety. This application claims the benefit of and claims priority to U.S. patent application Ser. No. 13/306,554, filed Nov. 29, 2011.

BACKGROUND

The present disclosure relates generally to flexible display panels, and more particularly, to force measurement in such display panels.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices include display panels that provide visual images to a user of the electronic device. These display panels may allow a user to interact with a graphical user interface of the electronic devices by enabling touch control of a graphical user interface. Typically, such touch controls have relied on touch positioning to interact with the graphical user interface. However, graphical user interfaces that are limited to receiving touch position inputs may limit the interaction available with the electronic device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for detecting force measurements (e.g., exerted pressure) of a flexible display panel of an electronic device. In certain embodiments, the display panel force measurements may be useful to detect intentional pressure exerted on the flexible display panel (e.g., a touch force input for a graphical user interface).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
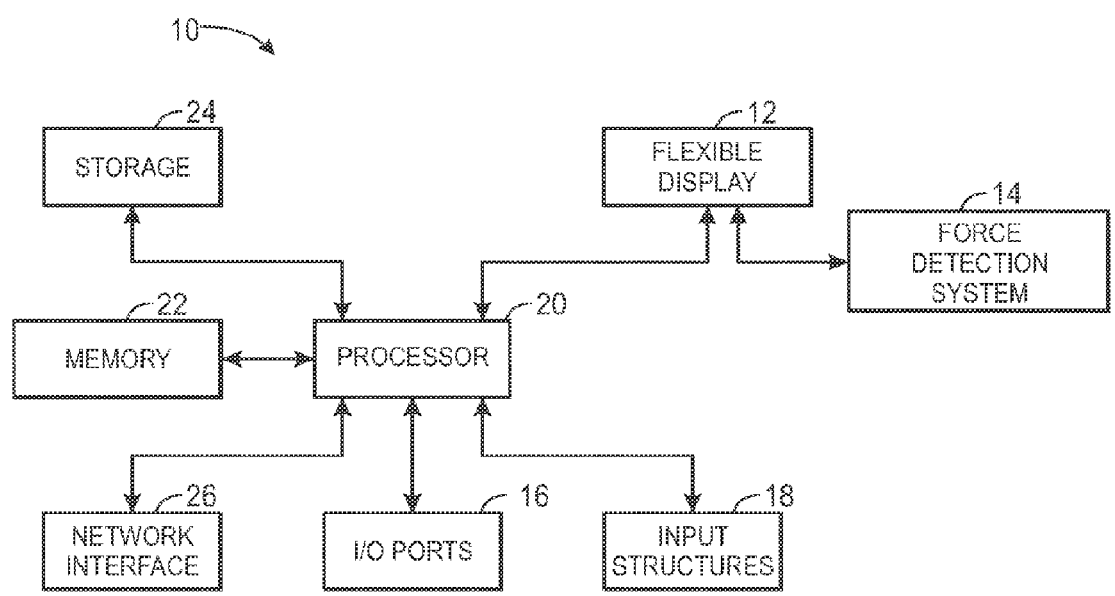
FIG. 1 is a schematic block diagram of an electronic device with a flexible display and a force detection system, in accordance with an embodiment.

As may be appreciated, electronic devices may include various components that contribute to the function of the device. For instance, FIG. 1 is a block diagram illustrating components that may be present in one such electronic device 10. The various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a flexible display 12 (e.g., a display enabled to deflect or flex in one or more regions), a force detection system 14 coupled to the flexible display 12, input/output (I/O) ports 16, input structures 18, one or more processors 20, one or more memory devices 22, non-volatile storage 24, and a network interface 26. The network interface 26 may provide communications capabilities through a wired (e.g., Ethernet) or wireless (e.g., Wi-Fi) network.

The flexible display 12 may be used to display various images generated by the electronic device 10. For example, the processor 20 may provide image data to the flexible display 12. Further, the non-volatile storage 24 may be configured to store image data provided by the processor 20. The flexible display 12 may be any suitable flexible display, such as an organic light-emitting diode (OLED) display. Additionally, the flexible display 12 may have touch-sensing capabilities that may be used as part of the control interface for the electronic device 10.

The flexible display 12 may be coupled to the force detection system 14, controlled by the processor 20. As will be described in more detail below, the force detection system 14 may enable the processor 20 to detect a magnitude of touch in the flexible display 12. Information about these magnitudes of touch may be stored in the non-volatile storage 24 or communicated to an external entity (e.g., through use of the I/O ports 16 or the network interface 26).

Figure 2:
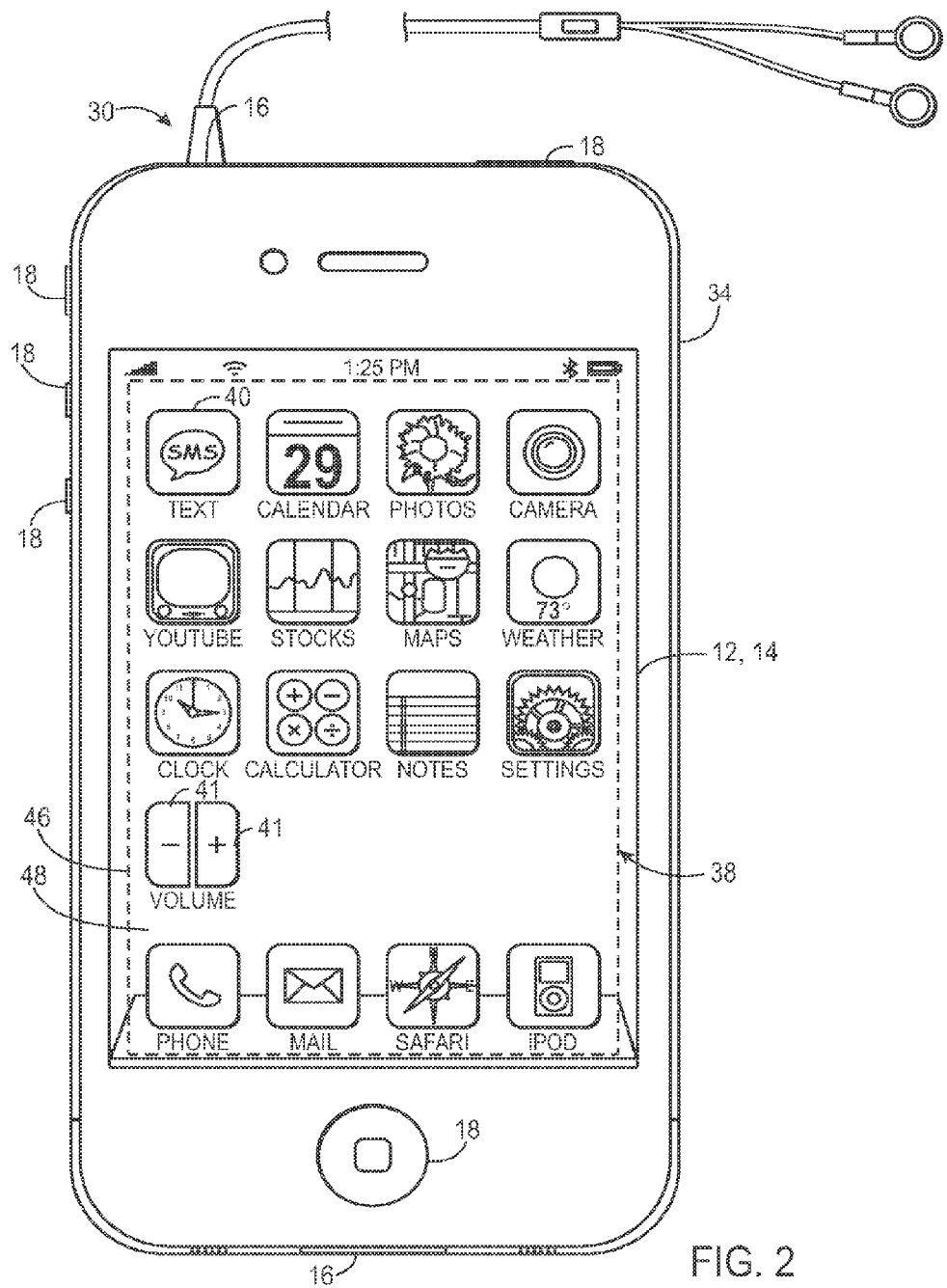
FIG. 2 is a perspective view of a handheld electronic device including a display with flexible regions and the force detection system, in accordance with an embodiment.

The electronic device 10 may take the form of a cellular telephone or some other type of electronic device. In certain embodiments, electronic device 10 in the form of a handheld electronic device may include a model of an iPod® or iPhone® available from Apple Inc. of Cupertino, Calif. By way of example, an electronic device 10 in the form of a handheld electronic device 30 (e.g., a cellular telephone) is illustrated in FIG. 2 in accordance with one embodiment. The depicted handheld electronic device 30 includes a flexible display 12 (e.g., in the form of an OLED or some other suitable flexible display), I/O ports 16, and input structures 18.

Although the electronic device 10 is generally depicted in the context of a cellular phone in FIG. 2, an electronic device 10 may also take the form of other types of electronic devices. In some embodiments, various electronic devices 10 may include media players, personal data organizers, handheld game platforms, cameras, and combinations of such devices. For instance, the electronic device 10 may be provided in the form of handheld electronic device 30 that includes various functionalities (such as the ability to take pictures, make telephone calls, access the Internet, communicate via email, record audio and video, listen to music, play games, and connect to wireless networks). In another example, the electronic device 10 may also be provided in the form of a portable multi-function tablet computing device. By way of example, the tablet computing device may be a model of an iPad® tablet computer, available from Apple Inc. Alternatively, the electronic device 10 may also be provided in the form of a desktop or notebook computer with the flexible display 12. For example, the desktop or notebook computer may be a model of an iMac®, MacBook Air®, or MacBook Pro® equipped with a flexible display 12. Alternatively, the electronic device 10 may also be provided in the form of a television, a large-area video player, or a device used for electronic gaming. Alternatively, the electronic device 10 may also be provided in the form of digital signage, a public information display, or other display device with a purpose to convey advertising or information. Although the following disclosure uses the handheld device 30 by way of example, it should be understood that the force detection system 14 may be employed in like fashion in any suitable form factor, such as those mentioned above.

In the depicted embodiment, the handheld electronic device 30 includes the flexible display 12 with the force detection system 14 of FIG. 1. The flexible display 12 may display various images generated by the handheld electronic device 30, such as a graphical user interface (GUI) 38 having icons 40. A user may interact with the handheld device 30 by accessing the user inputs 18 and accessing the GUI 38 through touching the flexible display 12. In certain embodiments, the force detection system 14 may aid in the user interaction with the GUI 38 of the handheld electronic device 30. For example, when a user exerts a force upon the flexible display 12, one or more layers of the flexible display 12 may flex inward. The force detection system 14 may detect the location and magnitude of the flex and provide a user input signal to the processor 20 based upon the location and magnitude of the flex.

In certain embodiments, the GUI 38 may be enabled to provide a variety of functionalities based upon an amount of force provided to the GUI 38. In one embodiment, an icon may be enabled to affect a change at different rates based upon a pressure exerted on the icon. For example, in the depicted embodiment, the volume icons 41 may be enabled to increase or decrease a volume of the handheld electronic device 30 in 1 dB increments when a light force is provided to the volume icons 41. When a heavy force is applied to the icons 41, the volume may be increased or decreased at a higher increment (e.g., 5 dB). In some embodiments, the force detection system 14 may be enabled to provide levels (e.g., low, medium, and high) of force to the processor 20 or other data processing circuitry based upon the magnitude of force of the flexible display 12 breaching certain thresholds. In other embodiments, the force detection system 14 may provide a continuously variable amount of force based upon the actual magnitude of force.

As will be described in more detail below, the flexible display 12 may include one or more flexible regions 44 that provide enhanced flexibility of the flexible display 12. The flexible regions 44 may be placed in regions of high activity (e.g., regions of the flexible display 12 where touch commands are likely to occur). For example, as depicted in the embodiment of FIG. 2, the flexible region 44 is placed around the areas of the flexible display 12 where the GUI 38 is likely to receive touch inputs (e.g., where the GUI 38 provides icons 40 and/or 41). The flexible display 12 may also include less flexible regions 46 with little to no flexibility. For example, in the embodiment of FIG. 2, the edges and corners of the flexible display 12 are less flexible regions 46. The less flexible regions 44 may protect the flexible display 12 by providing increased rigidity of the flexible display 12 in areas where magnitudes of force inputs may less-likely occur.

Figure 3:
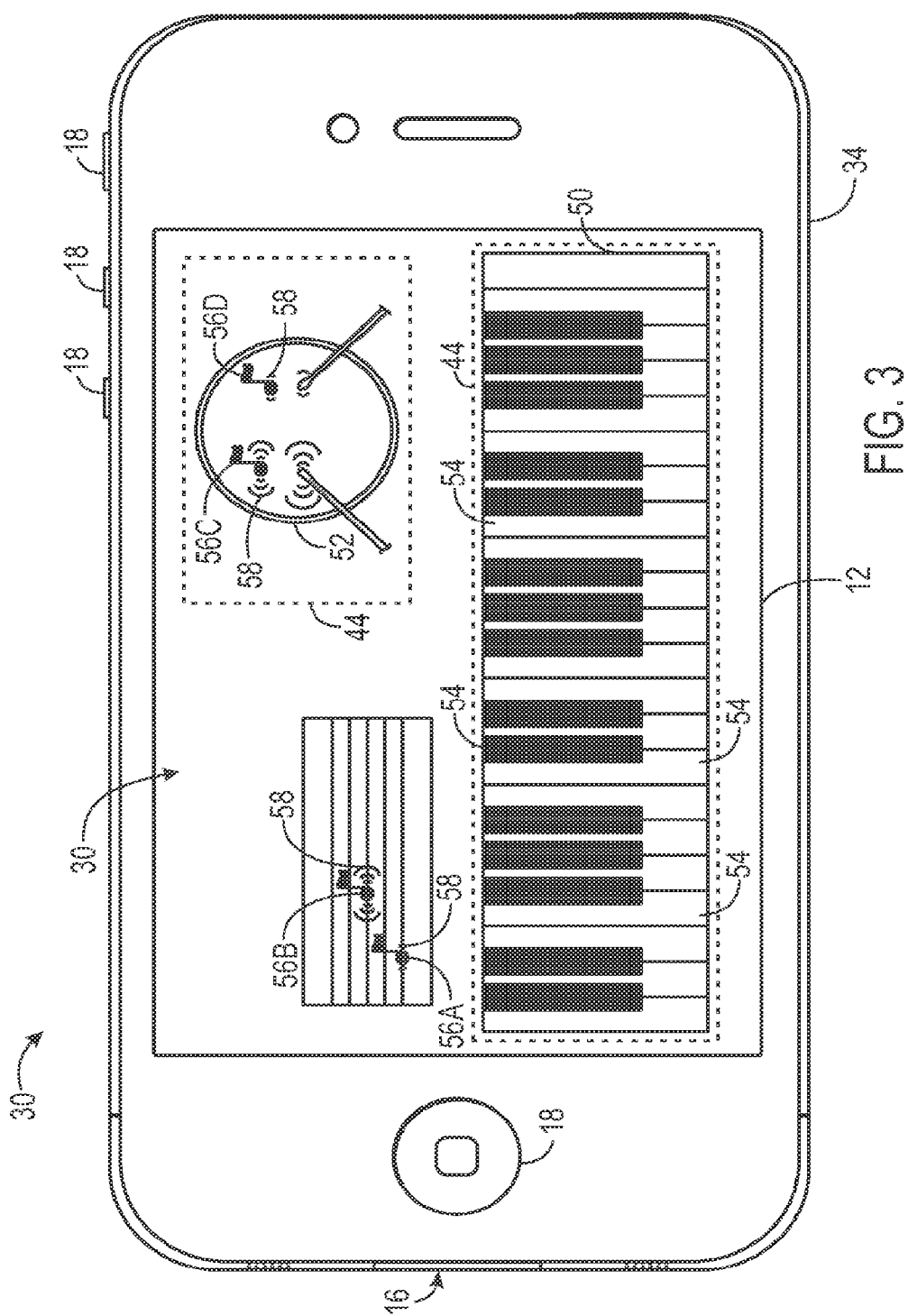
FIG. 3 is a perspective view of a handheld electronic device executing an application that uses the force detection system, in accordance with an embodiment.

Turning now to a more detailed discussion of how a GUI 38 of the handheld device 30 may interact with the magnitude of touch inputs, FIG. 3 illustrates the handheld device 36 running a music creation application, such as Garage-Band by Apple Inc. that uses magnitude of touch inputs. As previously discussed, the flexible display 12 provides flexible regions 44 that enable enhanced flexibility of the flexible display 12. As previously discussed, the flexible regions 44 may be placed anywhere on the flexible display 12. The GUI 38 may provide one or more virtual instruments (e.g., a piano 50 and/or a drum 52). As a user touches the keys 54 of the piano 50 or drumsticks 56A and/or 56 of the drum 52, the handheld device 30 may provide a visual and/or audio indication of a note (e.g., 58A, 58B, 58C, and/or 58D) being played. It may be beneficial to interact with the GUI 38 based upon magnitude of touch inputs. For example, when playing a piano, pressing keys with increased force may result in louder notes. Thus, by determining a magnitude of force input, the audible and visual indicators of the notes may provide variations in the loudness of notes. For example, the GUI 38 may provide a visual representation of notes 56A and 56B when keys 54 on the piano are pressed. Depending on the magnitude of force used to press the keys 54, the GUI 38 may provide variable loudness indicators 58. For example, the magnitude of force used to play note 56A was less than the magnitude of force used to play note 56B, as indicated by the loudness indicators 58. Similarly, the magnitude of force used to play note 56C is greater than the magnitude of force used to play note 56D, as is indicated by the loudness indicators 58.

Figure 4:
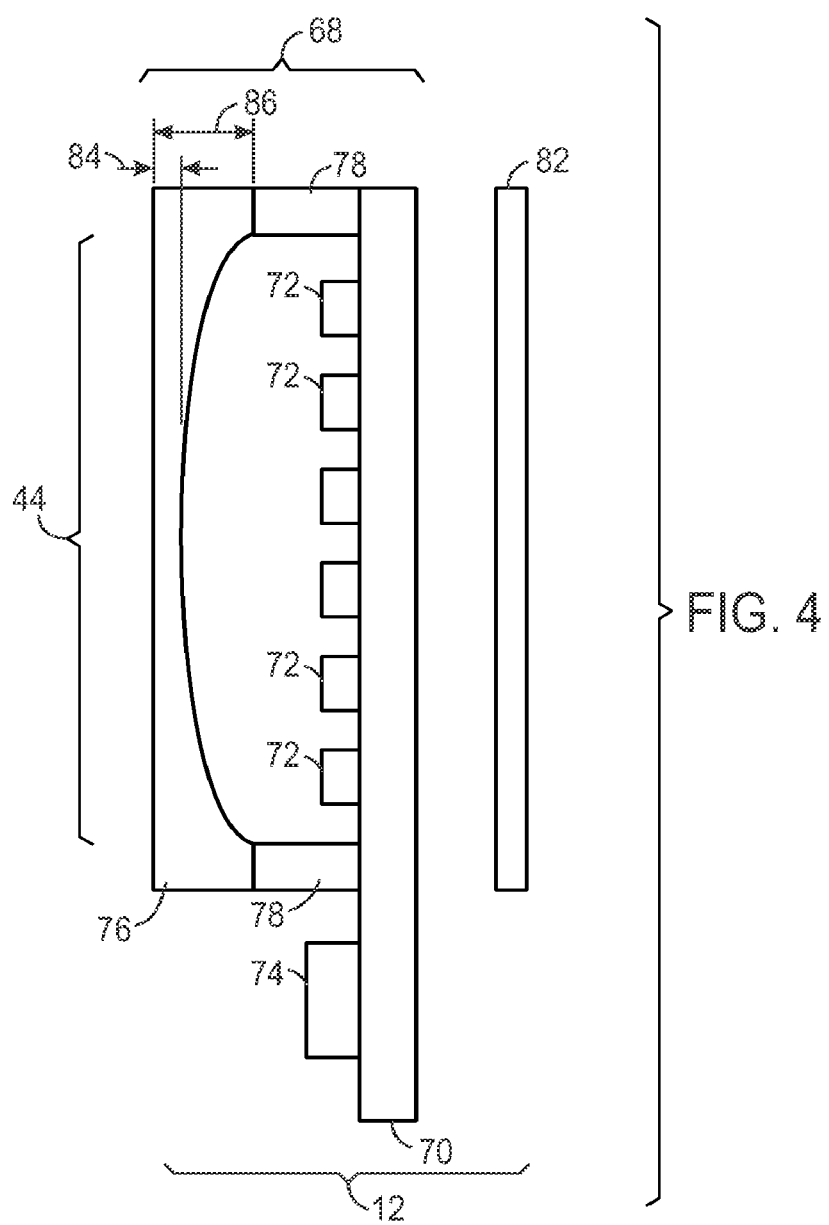
FIG. 4 is a cross-sectional side view of the layers of a display useful for enabling the techniques disclosed herein, in accordance with an embodiment.

As previously discussed, the flexible display 12 may be enabled to provide one or more flexible regions 44, such that more accurate magnitude of force measurements may be obtained through the flexible display 12. FIG. 4 illustrates a cross-sectional view of the layers present in a particular embodiment of the flexible display 12. In this embodiment, the flexible display 12 includes an OLED panel 68. The OLED panel 68 includes a substrate layer 70 (e.g., a polyethylene terephthalate (PET) substrate layer) on which a thin film transistor (TFT) layer may be formed. The TFT layer may define the various pixels of the OLED display and allow each pixel to be separately addressed. In one embodiment, each pixel may include a layer or layers of organic light emitting diodes 72 printed, deposited, or otherwise formed on the substrate layer 70 and the TFT layer. Each of the light emitting diodes 72 may emit specific colors (e.g., red, green, and blue) such that their color combined with other light emitting diodes 72 may form a color image. In alternative embodiments, the light emitting diodes 72 may each emit white and a color filter may transform the white light into specific colors (e.g., red, green, and blue). The operation of the TFT layer and the corresponding pixels of the OLED panel 68 may be coordinated and/or controlled by one or more driver chips 74 (such as a chip-on glass (COG), chip-on flex (COF), or gate-in-panel (GIP)) in communication with the TFT layer and/or the one or more processors 20 (FIG. 1).

The OLED panel 68 may also include a cover or external layer 76 (e.g., a cover glass or plastic) that forms the external viewing surface facing a viewer. In certain embodiments the cover layer 76 may perform various color filtration and/or polarization functions with respect to the light emitted by the OLED panel 68. In one embodiment, the cover layer 76 and the substrate layer 70 may be bonded together, such as by a glass frit bond 78, along all or part of the periphery of the surface and/or substrate layers. In one implementation, the OLED panel 68 is between about 0.03 mm and 1.9 mm in thickness. The thickness of the OLED panel 68 may directly impact flexibility of the OLED panel 68.

To create the flexible regions 44, the external layer 76 may be thinned. For example, in the embodiment depicted in FIG. 4, one flexible region 44 is created by thinning the external layer 76. As depicted, the thickness 84 of the external layer 76 is less at the flexible region 44 than the thickness 86 outside of the flexible region 44. In certain embodiments, the external layer 76 may be thicker near the edges of the external layer 76 to protect the flexible display 12 (e.g., from a drop) by providing a framed rigidity. However, in areas of high activity (e.g., the central area of the flexible display 12) a thinned external layer 76 may enhance the flexibility of the flexible display 12 such that more defined force measurements may be obtained.

As will be discussed in more detail below, the flexible display 12 may include a force measurement layer 82. As force is applied to the force measurement layer 82, attributes of the force measurement layer 82 change. The processor 20 (FIG. 1) or other data processing circuitry may measure the attribute changes, and determine a magnitude of force being applied to the flexible display 12. The force measurement layer 82 may include any material that is capable of being measured for changes in force. For example, in some embodiments, the force measurement layer 82 may include one or more thin film plates that vary in capacitance when force is applied to the plates. In some embodiments, the force measurement layer 82 may include one or more strain gauges that vary in resistance when force is applied. Other embodiments of the force measurement layer 82 may include an embedded layer that allows piezoelectric, optical, or any other measurement to obtain a magnitude of force. While shown in a separate layer disposed behind the OLED panel 68 in the embodiment depicted in FIG. 4, the force measurement layer 82 may be disposed in other areas of the flexible display 12. For example, the force measurement layer 82, in the form of one or more strain gauges, may be embedding in the substrate layer 79, the pixel layer 72, and/or the TFT layer.

Figure 5:
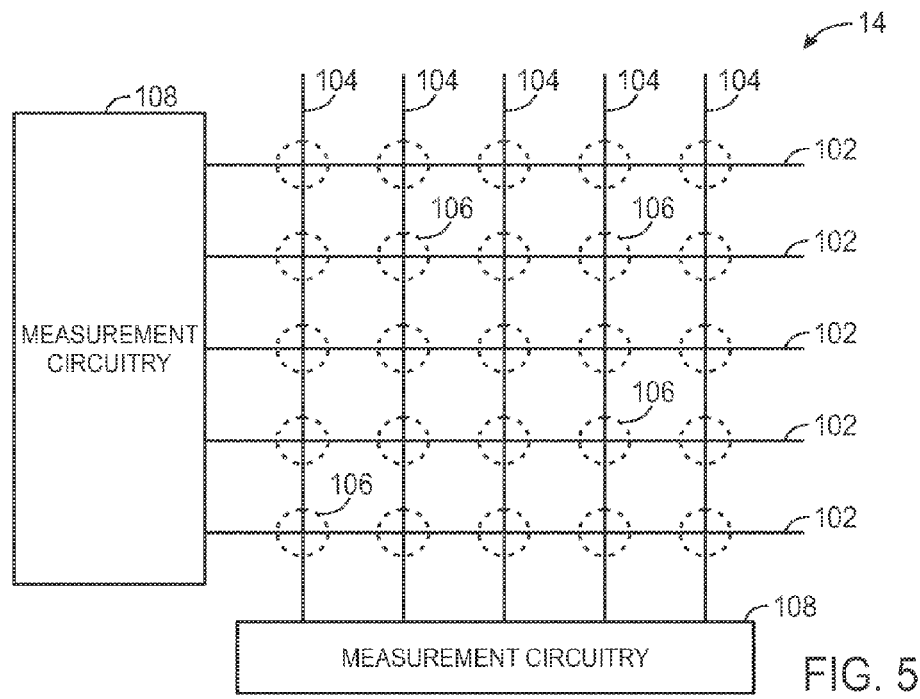
FIG. 5 is a schematic diagram of a force detection system, including a conductive mesh, in accordance with an embodiment.
Figure 6:
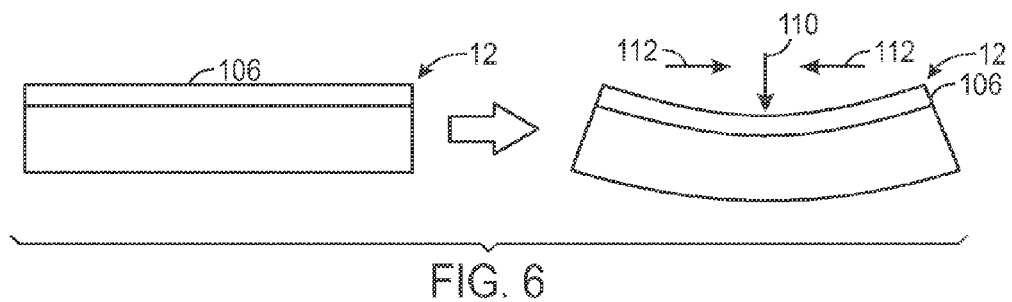
FIG. 6 is a schematic representation of a force being applied to the flexible display, in accordance with an embodiment.
Figure 7:
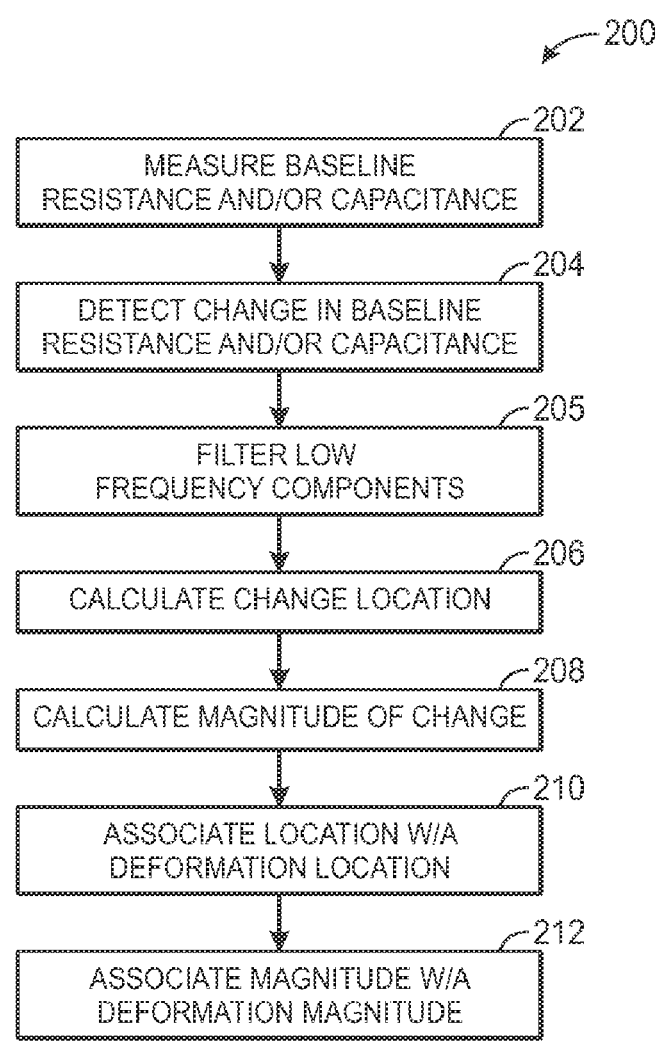
FIG. 7 is a flow chart depicting a process for detecting forces applied to the flexible display, in accordance with an embodiment.

FIG. 5 illustrates an embodiment of a force detection system 14 using a strain gauge 100. FIG. 6 illustrates an example of force being applied to the flexible display 12 and FIG. 7 provides a process for detecting the force being applied to a flexible display 12. For clarity, FIGS. 5-7 will be discussed jointly. The strain gauges 100 may be disposed within or overlaid on the flexible display 12. The strain gauges 100 may be may include an array of rows 102 and columns 104 of crossing conductive wires. The rows 102 and columns 104 may be disposed on separate planes, such that they only touch at crossing points when a force is applied to the rows 102 and/or columns 104. In some embodiments, the wires may consist of Indium Tin Oxide (ITO). In other embodiments, the wires may comprise of carbon nanotubes, grapheme, silver nanowires, copper nanowires, gold nanoparticles, metal oxide nanoparticles, or other conductive nanoscale materials. The resolution of the mesh layer 100 may be very fine (e.g., each wire may be very thin and close to the other wires). For example, the wires may have a diameter of approximately 10 microns and/or may be spaced within 70 microns of each other. As the wires of the strain gauges 100 (e.g., rows 102 and columns 104) stretch, they become narrower and longer, causing the resistance and/or capacitance of wires change. Thus, the resistance and/or capacitance of the force measurement pixels 106 (e.g., areas where the wires cross) may also change. For example, as a force 110 is applied to the flexible display 12, some wires of the strain gauge 100 may stretch and some wires of strain gauge 100 may compress. To determine the magnitude of force being exerted on the flexible display 12, resistance and/or capacitance changes in the strain gauge 100 may be measured. To do this, baseline resistance and/or capacitance measurements may be obtained (block 202). For example, the rows 102 and columns 104 may be coupled to the measurement circuitry 108. The measurement circuitry 108 may measure a baseline resistance and/or capacitance at portions of the strain gauge 100 where the rows 102 and columns 104 intersect (e.g., the force measurement pixels 106).

When a force 110 is exerted on the flexible display 12, the resistance and/or capacitance of the wires will change. For example, as illustrated in FIG. 6, a downward force 110 is exerted on the flexible display 12. The downward force 110 may cause the wires to compress 112 at one or more force measurement pixels 106. As the wires compress 112, the resistance may decrease (and thus the capacitance may increase). The measurement circuitry 108 may periodically or continuously measure the resistance and/or capacitance of the strain gauges 100 at the force measurement pixels 106. The processor 20 (FIG. 1) via a driver or instructions for the processor 20 may detect the change in resistance and/or capacitance based upon the measurements by the measurement circuitry 108 (block 204).

In certain embodiments, the force measurements may be associated with resistance and/or capacitance values that transition rapidly compared to other stimuli that may affect the resistance and/or capacitance (e.g., temperature changes). For example, the exerted force may cause resistance and/or capacitance values in the strain gauges 100 to shift rapidly, (e.g., due to the wire stretching rapidly). Thus, slowly transitioning variations in resistance and/or capacitance (e.g., those caused by temperature changes) may be filtered with a low frequency filter (e.g., a high pass filter) (block 205). The measurement circuitry 108 may then provide the filtered resistance and/or capacitance measurements to the processor 20 or other data processing circuitry.

Upon finding a change in the baseline resistance and/or capacitance, the force detection system 14 may determine a location (e.g., locations of the resistance pixels 106) where the change occurred (block 206). Further, the measure of the change in the resistance and/or capacitance from the baseline may be measured by the measurement circuitry 108 to calculate a magnitude of change (block 208).

As previously discussed, the rows 102 and columns 104 of wires may be very small. Thus, the wires may include a very low resistance. Therefore, the change in resistance and/or capacitance based upon the exerted force may also be quite low. The measurement circuitry 108 may include very sensitive measurement circuitry to account for the very low resistance levels. In certain embodiments, the change in resistance of the wires may be on the order of micro-ohms.

Certain processor instructions executed on the electronic device may utilize information relating to the exerted force location and/or exerted force magnitude rather than a resistance and/or capacitance change location and magnitude. Thus, in some embodiments, it may be beneficial to associate the location of the resistance and/or capacitance change with an exerted force location (e.g., the location of the force measurement pixels 106 where the change occurred) (block 210) and associate the magnitude of change in the resistance and/or capacitance with a magnitude of force exerted upon the flexible display 12 (block 212). In certain embodiments, a lookup table stored in the non-volatile storage 24 may associate magnitude of force values with specific resistance change values. Using the lookup table, the processor 20 may associate the resistance and/or capacitance change with a magnitude of force exerted on the handheld electronic device 30.

In certain embodiments, it may be desirable to reset (e.g., re-measure) the baseline periodically. Over time, the strain gauges 100 may retain some of the capacitance and/or resistance changes caused by forces exerted on the flexible display 12. Resetting the baseline may help to ensure that any retained capacitance and/or resistance changes are taken into account when determining the changes in resistance and/or capacitance of the wires. The baseline may be measured at pre-determined time periods or upon the occurrence of certain events. For example, the baseline might be re-measured daily at midnight or once per month at 3:00 A.M. In other embodiments, the baseline may be reset by through at a manufacturer's facility when the handheld electronic device 30 is brought in for repair. In cellular telephone embodiments, the baseline may be reset automatically each time a new cellular service tower is encountered by the cellular telephone. Further, the baseline may be reset through the use of a menu setting displayed on the GUI 38.

Locating and measuring exerted force upon a flexible display 12 may be useful in detecting intentional magnitudes of force applied to the flexible display 12. For example, intentional display panel strain may be useful in providing a more dynamic GUI 38 that takes into account an amount of force that is being applied via touch input to the flexible display 12.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A force detection system, comprising:
   a display;
   a force measurement layer disposed on or in the display, wherein the force measurement layer has an attribute with a baseline measurement; and
   force measurement circuitry configured to determine the baseline measurement of the force measurement layer at pre-determined time periods, detect a change in the baseline measurement in at least one portion of the force measurement layer, calculate a force input location based entirely upon the change in the baseline measurement, calculate a magnitude of force based entirely upon the change in the baseline measurement, provide a first touch command input to the display when the magnitude of force is greater than a first level of force, and provide a second touch command input to the display when the magnitude of force is greater than a second level of force, wherein the first and second levels of force are different.

2. The force detection system of claim 1, wherein the display comprises a cover layer that comprises thinned regions.

3. The force detection system of claim 2, wherein the thinned regions are located in regions of the display where touch inputs are likely to occur.

4. The force detection system of claim 1, wherein the force measurement layer comprises one or more strain gauges that decrease in resistance when compressed.

5. The force detection system of claim 1, wherein the force measurement layer comprises one or more thin film plates that vary in capacitance when force is applied.

6. The force detection system of claim 1, wherein the baseline measurement comprises a baseline resistance measurement, and wherein the force measurement circuity is configured to detect a change in the baseline resistance measurement of an order of micro-ohms.

7. The force detection system of claim 1, wherein the force measurement layer comprises an array of rows and columns of crossing conductive wires.

8. The force detection system defined in claim 1, wherein the baseline measurement is a baseline measurement selected from the group consisting of: a baseline resistance measurement and a baseline capacitance measurement.

9. The force detection system defined in claim 8, wherein the baseline measurement is a baseline resistance measurement and the change in the baseline measurement is a change in resistance of the baseline resistance measurement.

10. The force detection system defined in claim 8, wherein the baseline measurement is a baseline capacitance measurement and the change in the baseline measurement is a change in capacitance of the baseline capacitance measurement.

11. An electronic device, comprising:
    a display;
    a force measurement layer disposed in or on the display, wherein the force measurement layer measures an attribute with a baseline measurement, wherein the attribute is an attribute selected from the group consisting of: a resistance and a capacitance, and wherein the attribute changes from the baseline measurement to a modified measurement in response to a touch input; and processing circuitry configured to:
calculate a difference between the baseline measurement of the attribute and the modified measurement of the attribute;
in response to calculating the difference between the baseline measurement of the attribute and the modified measurement of the attribute, using the difference between the baseline measurement of the attribute and the modified measurement of the attribute to determine a location of the touch input;
in response to calculating the difference between the baseline measurement of the attribute and the modified measurement of the attribute, using the difference between the baseline measurement of the attribute and the modified measurement of the attribute to determine a magnitude of force of the touch input; and
provide a graphical output to the display that depends on the location of the touch input and the magnitude of force of the touch input.

12. The electronic device of claim 11, wherein the display comprises one or more flexible regions.

13. The electronic device of claim 11, wherein the display comprises an organic light-emitting diode display.

14. An electronic device, comprising:
a display;
an array of rows and columns of crossing conductive lines disposed on or in the display, wherein the rows of conductive lines are located in a first plane, wherein the columns of conductive lines are located in a second plane that is different than the first plane;
force measurement circuitry configured to measure an attribute of the array, wherein the attribute is selected from the group consisting of: a resistance and a capacitance, wherein the attribute changes from a baseline value to a modified value when a distance between at least two of the conductive lines changes, and wherein there is a difference between the baseline value of the attribute and the modified value of the attribute; and
processing circuitry configured to determine a force input location based entirely upon the difference between the baseline value of the attribute and the modified value of the attribute and determine a magnitude of force based entirely upon the difference between the baseline value of the attribute and the modified value of the attribute.

15. The electronic device defined in claim 14, wherein the rows and columns of conductive lines do not contact each other unless a force is applied to the array.

16. The electronic device defined in claim 14, wherein the conductive lines comprise conductive wires that have a diameter of about 10 microns and wherein the rows of conductive lines are spaced within 70 microns of each other.

17. The electronic device defined in claim 14, wherein the attribute comprises the resistance, the electronic device further comprising a low frequency filter that filters the resistance, wherein the low frequency filter filters variations in the resistance of the array of rows and columns of crossing conductive lines that arise from temperature changes.

18. The electronic device defined in claim 14, wherein the conductive lines comprise a conductive nanoscale material.

19. The electronic device defined in claim 14, wherein the attribute comprises the capacitance.

* * * * *